(12) United States Patent
Ambekar et al.

(10) Patent No.: US 7,093,106 B2
(45) Date of Patent: Aug. 15, 2006

(54) REGISTER RENAME ARRAY WITH INDIVIDUAL THREAD BITS SET UPON ALLOCATION AND CLEARED UPON INSTRUCTION COMPLETION

(75) Inventors: Asit S. Ambekar, Austin, TX (US); Dung Q. Nguyen, Austin, TX (US); Raymond C. Yeung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 10/422,021

(22) Filed: Apr. 23, 2003

(65) Prior Publication Data

US 2004/0215936 A1    Oct. 28, 2004

(51) Int. Cl.
  *G06F 9/38* (2006.01)
  *G06F 9/46* (2006.01)

(52) U.S. Cl. ....................... 712/217; 709/107

(58) Field of Classification Search ................. 712/23, 712/216, 217; 718/107
See application file for complete search history.

(56) References Cited

U.S. PATENT DOCUMENTS

| | | | | |
|---|---|---|---|---|
| 5,961,636 | A | 10/1999 | Brooks et al. | 712/228 |
| 6,314,511 | B1 * | 11/2001 | Levy et al. | 712/217 |
| 6,721,874 | B1 * | 4/2004 | Le et al. | 712/218 |
| 2004/0006683 | A1 * | 1/2004 | Brekelbaum et al. | 712/217 |
| 2004/0073906 | A1 * | 4/2004 | Chamdani et al. | 718/102 |
| 2004/0216120 | A1 * | 10/2004 | Burky et al. | 718/107 |

* cited by examiner

*Primary Examiner*—Kenneth S. Kim
(74) *Attorney, Agent, or Firm*—Richard F. Frankeny; Winstead Sechrest & Minick P.C.; Charles K. Salys

(57) ABSTRACT

A single rename register array is used in an SMT processor. Two bits are added to each register address of the rename register array, one for bit for thread zero (CTB0) and one bit for thread one (CTB1). The CTB bits are all set to a logic value on power on or start-up. A control instruction (CI) that sets control bits used by other instructions is assigned a register in the rename register array having an address designated as pointer (PTR) address. When a control instruction with an assigned entry with PTR address M completes, then the CTB bit at the PTR address M is flipped to its opposite logic state; likewise, its Valid bit is set to a "not" Valid state. The self resetting CTB bit is used to determine whether an issued instruction sources a register in the rename register array or a corresponding architected register.

23 Claims, 4 Drawing Sheets

REGISTER RENAME ARRAY WITH INDIVIDUAL THREAD BITS SET UPON ALLOCATION AND CLEARED UPON INSTRUCTION COMPLETION

TECHNICAL FIELD

The present invention relates in general to methods and circuitry for a processor having simultaneous multithreading (SMT) and single thread operation modes.

BACKGROUND INFORMATION

For a long time, the secret to more performance was to execute more instructions per cycle, otherwise known as Instruction Level Parallelism (ILP), or decreasing the latency of instructions. To execute more instructions each cycle, more functional units (e.g., integer, floating point, load/store units, etc.) have to be added. In order to more consistently execute multiple instructions, a processing paradigm called out-of-order processing (OOP) may be used, and in fact, this type of processing has become mainstream.

OOP arose because many instructions are dependent upon the outcome of other instructions, which have already been sent into the processing pipeline. To help alleviate this problem, a larger number of instructions are stored in order to allow immediate execution. The reason this is done is to find more instructions that are not dependent upon each other. The area of storage used to store the instructions that are ready to execute immediately is called the reorder buffer. The size of reorder buffers have been growing in most modern commercial computer architectures with some systems able to store as many as 126 instructions. The reason for increasing the size of the reorder buffer is simple: code that is spatially related tends also to be temporally related in terms of execution (with the possible exclusion of arrays of complex structures and linked lists). The only problem is that these instructions also have a tendency to depend upon the outcome of prior instructions. With a CPU's ever increasing amount of required code, the only current way to find more independent instructions has been to increase the size of the reorder buffer.

However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, one can focus upon a coarser form of extracting performance at the instruction or thread level, via multithreading (multiprocessing), but without the system bus as a major constraint.

The ability to put more transistors on a single chip has allowed on-chip multiprocessing (CMP). To take advantage of the potential performance increases, the architecture cannot use these multiple processors as uniprocessors but rather must use multiprocessing that relies on executing instructions in a parallel manner. This requires the programs executed on the CMP to also be written to execute in a parallel manner rather than in a purely serial or sequential manner. Assuming that the application is written to execute in a parallel manner (multithreaded), there are inherent difficulties in making the program written in this fashion execute faster proportional to the number of added processors.

The general concept behind using multiple cores on one die is to extract more performance by executing two threads at once. By doing so, the two CPUs together are able to keep a higher percentage of the aggregate number of functional units doing useful work at all times. If a processor has more functional units, then a lower percentage of those units may be doing useful work at any one time. The on-chip multiprocessor lowers the number of functional units per processor, and distributes separate tasks (or threads) to each processor. In this way, it is able to achieve a higher throughput on both tasks combined. A comparative uniprocessor would be able to get through one thread, or task, faster than a CMP chip could, because, although there are wasted functional units, there are also "bursts" of activity produced when the processor computes multiple pieces of data at the same time and uses all available functional units. One idea behind multiprocessors is to keep the individual processors from experiencing such burst activity times and instead have each processor use what resources it has available more frequently and therefore efficiently. The non-use of some of the functional units during a clock cycle is known as "horizontal waste," which CMP tries to avoid.

However, there are problems with CMP. The traditional CMP chip sacrifices single-thread performance in order to expedite the completion of two or more threads. In this way, a CMP chip is comparatively less flexible for general use, because if there is only one thread, an entire half of the allotted resources are idle and completely useless (just as adding another processor in a system that uses a singly threaded program is useless in a traditional multiprocessor (MP) system). One approach to making the functional units in a CMP more efficient is to use course-grained multithreading (CMT). CMT improves the efficiency with respect to the usage of the functional units by executing one thread for a certain number of clock cycles. The efficiency is improved due to a decrease in "vertical waste." Vertical waste describes situations in which none of the functional units are working due to one thread stalling.

When switching to another thread, the processor saves the state of that thread (i.e., it saves where instructions are in the pipeline, which units are being used) and switches to another one. It does so by using multiple register sets. The advantage of this is due to the fact that often a thread can only go for so long before it falls upon a cache miss, or runs out of independent instructions to execute. A CMT processor can only execute as many different threads in this way as it has support for. So, it can only store as many threads as there are physical locations for each of these threads to store the state of their execution. An N-way CMT processor would therefore need to have the ability to store the state of N threads.

A variation on this concept would be to execute one thread until it has experienced a cache miss (usually a L2 (secondary) cache miss), at which point the system would switch to another thread. This has the advantage of simplifying the logic needed to rotate the threads through a processor, as it will simply switch to another thread as soon as the prior thread is stalled. The penalty of waiting for a requested block to be transferred back into the cache is then alleviated. This is similar to the hit under miss (or hit under multiple miss) caching scheme used by some processors, but it differs because it operates on threads instead of upon instructions. The advantages of CMT over CMP are CMT does not sacrifice single-thread performance, and there is less hardware duplication (less hardware that is halved to make the two processors "equal" to a comparable CMT).

A more aggressive approach to multithreading is called fine-grained multithreading (FMT). Like CMT, the basis of FMT is to switch rapidly between threads. Unlike CMT, however, the idea is to switch each and every cycle. While both CMT and FMT actually do indeed slow down the completion of one thread, FMT expedites the completion of all the threads being worked on, and it is overall throughput which generally matters most.

CMPs may remove some horizontal waste in and unto themselves. CMT and FMT may remove some (or all) vertical waste. However an architecture that comprises an advanced form of multithreading, referred to as Simultaneous Multithreading (SMT), may be used to reduce both horizontal and vertical waste. The major goal of SMT is to have the ability to run instructions from different threads at any given time and in any given functional unit. By rotating through threads, an SMT architecture acts like an FMT processor, and by executing instructions from different threads at the same time, it acts like CMP. Because of this, it allows architects to design wider cores without the worry of diminishing returns. It is reasonable for SMT to achieve higher efficiency than FMT due to its ability to share "unused" functional units among differing threads; in this way, SMT achieves the efficiency of a CMP machine. However, unlike a CMP system, an SMT system makes little to no sacrifice (the small sacrifice is discussed later) for single threaded performance. The reason for this is simple. Whereas much of a CMP processor remains idle when running a single thread and the more processors on the CMP chip makes this problem more pronounced, an SMT processor can dedicate all functional units to the single thread. While this is obviously not as valuable as being able to run multiple threads, the ability to balance between single thread and multithreaded environments is a very useful feature. This means that an SMT processor may exploit thread-level parallelism (TLP) if it is present, and if not, will give full attention to instruction level parallelism (ILP).

In order to support multiple threads, an SMT processor requires more registers than the traditional superscalar processor. The general aim is to provide as many registers for each supported thread as there would be for a uniprocessor. For a traditional reduced instruction set computer (RISC) chip, this implies 32 times N registers (where N is the number of threads an SMT processor could handle in one cycle), plus whatever renaming registers are required. For a 4-way SMT processor RISC processor, this would mean 128 registers, plus however many renaming registers are needed.

Most SMT models are straightforward extensions of a conventional out-of-order processor. With an increase in the actual throughput comes more demands upon instruction issue width, which should be increased accordingly. Because of the aforementioned increase in the register file size, an SMT pipeline length may be increased by two stages (one to select register bank and one to do a read or write) so as not to slow down the length of the clock cycle. The register read and register write stages are therefore both broken up into two pipelined stages.

In order to not allow any one thread to dominate the pipeline, an effort should be made to ensure that the other threads get a realistic slice of the execution time and resources. When the functional units are requesting work to do, the fetch mechanism will provide a higher priority to those threads that have the fewest instructions already in the pipeline. Of course, if the other threads have little they can do, more instructions from the thread are already dominating the pipelines.

SMT is about sharing whatever possible. However, in some instances, this disrupts the traditional organization of data, as well as instruction flow. The branch prediction unit becomes less effective when shared, because it has to keep track of more threads with more instructions and will therefore be less efficient at giving an accurate prediction. This means that the pipeline will need to be flushed more often due to miss prediction, but the ability to run multiple threads more than makes up for this deficit.

The penalty for a misprediction is greater due to the longer pipeline used by an SMT architecture (by two stages), which is in turn due to the rather large register file required. However, techniques have been developed to minimize the number of registers needed per thread in an SMT architecture. This is done by more efficient operating system (OS) and hardware support for better deallocation of registers, and the ability to share registers from another thread context if another thread is not using all of them.

Another issue is the number of threads in relation to the size of caches, the line sizes of caches, and the bandwidth afforded by them. As is the case for single-threaded programs, increasing the cache-line size decreases the miss rate but also increases the miss penalty. Having support for more threads which use more differing data exacerbates this problem and thus less of the cache is effectively useful for each thread. This contention for the cache is even more pronounced when dealing with a multiprogrammed workload over a multithreaded workload. Thus, if more threads are in use, then the caches should be larger. This also applies to CMP processors with shared L2 caches.

The more threads that are in use results in a higher overall performance and the differences in association of memory data become more readily apparent. There is an indication that when the L1 (primary) cache size is kept constant, the highest level of performance is achieved using a more associative cache, despite longer access times. Tests have been conducted to determine performance with varying block sizes that differ associatively while varying the numbers of threads. As before, increasing the associative level of blocks increased the performance at all times; however, increasing the block size decreased performance if more than two threads were in use. This was so much so that the increase in the degree of association of blocks could not make up for the deficit caused by the greater miss penalty of the larger block size.

Register renaming is a technique used to allow multiple execution paths without conflicts between different execution units trying to use the same registers. Instead of just one set of registers being used, multiple sets are put into the processor. This allows different execution units to work simultaneously without unnecessary pipeline stalls.

If a given machine has n logical registers, named R0, R1, . . . Rn, in hardware it contains a table of physical registers, r0, r1, . . . rm, where m=n. For each logical register, there is a pointer that points to one of the physical registers (at start-up, R0–r0, R1–r1, . . . Rn–rn.). For a given register reference, RX, there is a pointer from that logical register to some physical register, rY. When instructions are fetched, their register references are examined. If the instruction is reading the register, then the value RX in the instruction is "renamed" to rY. If the instruction is writing to the register, then, several steps occur. First, register rY is tagged with the program counter (PC) of this instruction. Second, an empty entry in the register table is picked, rZ. Third, RX's pointer is changed to point to rZ. Fourth, the value RX in the instruction is changed to rZ. If an instruction, for example R1=R1+R2 is encountered, the register reads and writes are dealt with separately, as discussed above, with the reads being handled first. In this way, different values of the same logical register may exist at the same time, but each instruction knows which one it is using. With the above algorithm, the physical register table will eventually fill up. A method needs to be provided to free entries in the table. The logical method is to keep a count of all uncommited instructions which still need to read this table entry. Once all of these reads occur, the entry can be freed. But there is a simpler method that works almost as well. Upon every write to a register, tag the old table entry with the PC, before choosing a new entry (as already indicated in the above algorithm). Then, whenever instructions are committed, their program counters are compared to all of the physical register's tags. If there is a match, then it is known that there are no outstanding references to this entry, assuming in-order-completion.

In an SMT, system renaming is made more difficult especially when a single rename array is used for the multiple threads. The rename array needs to know when to reassign a register of a completed instruction. Also any dependent instruction on the completed instruction needs to be notified at issue time whether to use values in the rename register or values in the corresponding architected register. There is, therefore, a need for a method and mechanism that supports SMT in a system using a single rename array that efficiently releases rename registers when an instructions completes and notifies in flight dependent instructions of changes in the location of the source register for the completed instruction.

SUMMARY OF THE INVENTION

A single rename register (RR) array is used in an SMT processor for a specific architected register such as floating point source condition register (FPSCR). Two bits are added to each rename register entry of the rename register array, one complete thread bit for thread zero (CTB0) and one bit for thread one (CTB1). The CTB bits are all set to a logic value on power on or start-up. A control instruction (CI) that sets control bits used by other instructions is assigned a register in the rename register array having an address designated by a pointer (PTR) address. Each register entry or position also has a Valid bit indicating whether the entry is free to reassign to another instruction. When a control instruction with an assigned entry with PTR address M completes, then the CTB bit at the PTR address M is flipped to its opposite logic state; likewise, its Valid bit is set to a "not" Valid state.

As an exemplary CI from thread zero (T0) is dispatched, its PTR address, CTB0, an identifying tag (e.g., Gtag) for the CI, and its Valid bit are stored in a thread zero PTR register (PTR0) as the most current CI. When a dependent instruction to the CI is dispatched, the PTR address, CTB0, and the Valid bit from PTR0 are stored with the dispatched instruction at its address in an instruction queue (IQ).

At the time a CI (e.g., from T0) completes execution, the completion unit signals the RR array to flip (set to its opposite logic state) the CTB0 corresponding to the completed CI in the RR array. Likewise if the Gtag of the completed CI matches the Gtag stored in PTR0, then the Valid bit in PTR0 is set to a not Valid state. A dependent instruction that issues from the IQ has its stored CTB bit (in this case CTB0) coupled to a means for comparing the state of the CTB0 from the IQ to the state of the CTB0 retrieved from the RR array at its stored PTR address. A thread bit (TB) 236 stored with the issued instruction determines whether the CTB0 or CTB1 at the PTR address in the RR array is compared. The Valid bit stored with the issued instruction is also coupled to the means for comparing the state of the CTB bits. If the Valid bit stored with the issued instruction indicates not Valid, then the issued instruction gets its control bits from the architected register. If the Valid bit indicates a Valid state, then the issued instruction uses the control bits in the RR array at the PTR address stored with the issued instruction if the CTB bit retrieved from the RR array compares with the CTB bit stored with the issued instruction. Otherwise, if the CTB bit retrieved from the RR array does not match with the CTB bit stored with the issued instruction, then the issued instruction uses the architected register.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
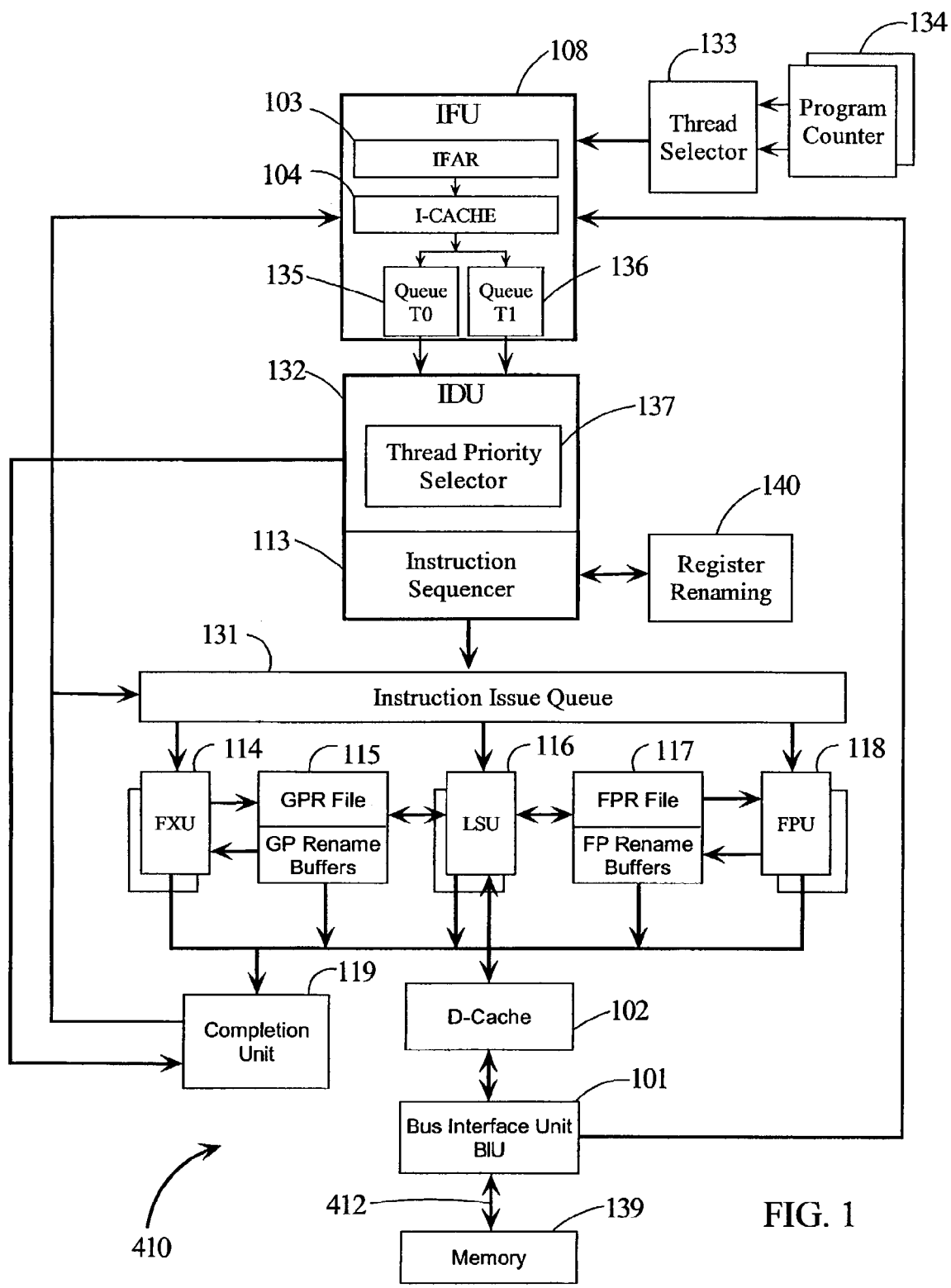
FIG. 1 is a block diagram of functional units in an SMT processor according to embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there are illustrated details of CPU 410. CPU 410 is designed to execute multiple instructions per clock cycle. Thus, multiple instructions may be executing in any of the execution units, fixed point units (FXUs) 114, floating point units (FPUs) 118, and load/store units (LSUs) 116 during any one clock cycle. Likewise, CPU 410 may simultaneously execute instructions from multiple threads in an SMT mode.

Program counters (PCs) 134 correspond to thread zero (T0) and thread one (T1) that have instructions for execution. Thread selector 133 alternately selects between T0 and T1 to couple an instruction address to instruction fetch unit (IFU) 108. Instruction addresses are loaded into instruction fetch address register (IFAR) 103. IFAR 103 alternately fetches instructions for each thread from instruction cache (I-Cache) 104. Instructions are buffered in instruction queue (IQ) 135 for T0 and IQ 136 for T1. IQ 135 and IQ 136 are coupled to instruction dispatch unit (IDU) 132. Instructions are selected and read from IQ 135 and IQ 136 under control of thread priority selector 137. Normally, thread priority selector 137 reads instructions from IQ 135 and IQ 136 substantially proportional to each thread's program controlled priority.

The instructions are decoded in a decoder (not shown) in IDU 132. Instruction sequencer 113 then may place the instructions in groups in an order determined by various algorithms. The groups of instructions are forwarded to instruction issue queue (IIQ) 131. The instruction sequencer 113 receives instructions from both threads in program order, but the instructions may be issued from the IIQ 131 out of program order and from either thread. The general purpose register (GPR) file 115 and floating point register (FPR) file 117 are used by multiple executing units and represent the program state of the system. These hardware registers may be referred to as the "architected" registers. When an instruction is put into an issue queue, each architected register is renamed. Each architected register that is being modified is assigned a physical register and a corresponding look-up table identifies physical registers that are associated with an architected register. Therefore in the issue queue, the architected register has been renamed so that multiple copies of an architected register may exist at the same time. This allows instructions to be executed out-of-order as long as source operands are available. Register renaming unit 140, renames and maps the registers so that unused physical registers may be reassigned when all instructions referencing a particular physical register complete and the physical register does not contain the latest architected state.

Instructions are queued in IIQ 131 for execution in the appropriate execution unit. If an instruction contains a fixed point operation, then any of the multiple fixed point units (FXUs) 114 may be used. All of the execution units, FXU 114, FPU 118 and LSU 116 are coupled to completion unit 119 that has completion tables (not shown) indicating which of the issued instructions have completed and other status information. Information from completion unit 119 is forwarded to IFU 108. IDU 132 may also send information to completion unit 119. Data from a store operation from LSU 116 is coupled to data cache (D-Cache) 102. This data may be stored in D-Cache Cache 102 for near term use and/or forwarded to bus interface unit (BIU) 101 which sends the data over bus 412 to memory 139. LSU 116 may load data from D-Cache 102 for use by the execution units (e.g., FXU 114).

Figure 2:
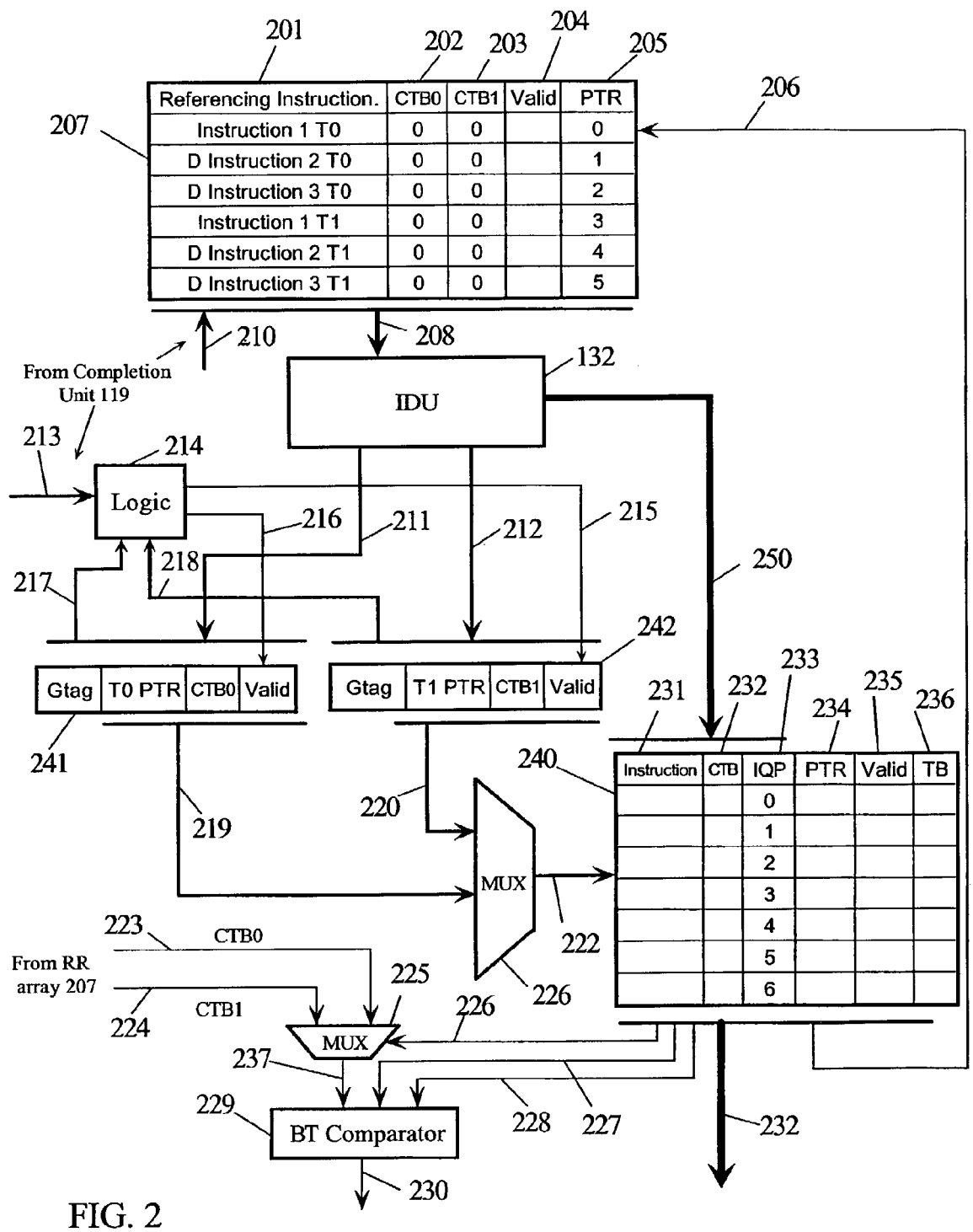
FIG. 2 is a block diagram of circuitry for implementing embodiments of the present invention.

FIG. 2 is a block diagram of function units used in embodiments of the present invention. Registers are used to temporarily store information used by instructions. As stated earlier, architected hardware registers are used by multiple execution units and represent the program state of the system. A specific type of architected register is the floating point status and control register (FPSCR) (not shown in FIG. 2). An SMT system according to embodiments of the present invention has one FPSCR per thread. Floating point instructions access control bits in the FPSCR that provide information relative to the floating point operation. Typically, a floating point control instruction sets the FPSCR for a following group of floating point instructions. These control instructions modify the behavior of all subsequent instructions. There may be multiple control instructions and each one will store its data in the RR array until it completes at which time its data is stored in a corresponding architected register. Each floating point instruction needs to know where to source the control bits at issue time.

Rename register (RR) array 207 in Rename Register unit 140 has an address (PTR) 205 for each register "entry". An instruction 201 (e.g., Instruction 1 T1) referencing the register at a PTR 205 also has a complete thread bit (CTB) for each thread that may use the entry, CTB0 202 for thread zero (T0) and CTB1 203 for T1. Likewise each register entry has a Valid bit 204 that indicates whether the entry is released for reassignment to another instruction. RR array 207 receives a signal 206 from instruction queue (IQ) 240 (e.g., in IIQs 131) to retrieve a CTB bit (203 or 204) corresponding to a stored PTR address when an instruction issues. RR array 207 also receives a signal 210 from a completion unit 119 (see FIG. 1) when a dispatched CI (e.g., for T0) has completed that "flips" the logic state of the CTB0 202 corresponding to the completed CI. The Valid bit of a completed CI is also set to the not Valid state.

Dispatch unit 132 dispatches control instructions (CI) that may have a reference to a register in RR array 207. When a CI (e.g., from T0) is dispatched, its CTB0 bit 202, Valid bit 204, and its PTR address 205 are stored in PTR register 241 as the current CI for T0. If the instruction was from T1, then corresponding CTB1 203, Valid bit 204 and PTR address 205 would be sent to PTR register 242. An instruction identifier (Gtag) identifying the instruction is also stored in PTR 241 or 242. If a dependent instruction to the current CI (e.g., thread 0) is dispatched, multiplexer 221 is signaled to select from PTR register 241 the store PTR address, the CTB0 bit, and the Valid bit stored for the current CI (from T0) and store the data with the dispatched instruction at its designated issue queue address (IQP) 233. This data stays with the dependent instruction dispatched to IQ 240 through issue from IQ 240. Instructions may be issued from IQ 240 out-of-order relative to their program order.

When a dependent instruction in IQ 240 issues, signal 206 retrieves the CTB bits (CTB 233 or CTB 224) stored at the register location of its corresponding CI determined by the value in its PTR 234. Its PTR 234 was stored when the dependent instruction was dispatched to IQ 240. Thread identification bit TB 236, from the issuing instruction, is coupled as signal 226 to MUX 225 and is used to select between CTB0 223 and CTB1 224 in MUX 225 as output 237. The selected CTB at output 237 is compared to the stored CTB 232 in IQ 240 depending on the state of the Valid bit coupled to input 227 of comparator 229. If the Valid bit indicates a Valid state, then the state of output 230 determines whether the issuing instructions uses RR array 207 or the corresponding architected register as its source register. If the Valid bit indicates a Valid state, then a compare of the CTB bits selects the rename register array at the corresponding PTR 234 address as the register source. If the CTB bits do not compare, then the corresponding architected register is used as the source register. If the Valid bit indicates a not Valid state, then the issuing instruction defaults to the architected registers as the source register for a completed CI instruction.

Figure 3:
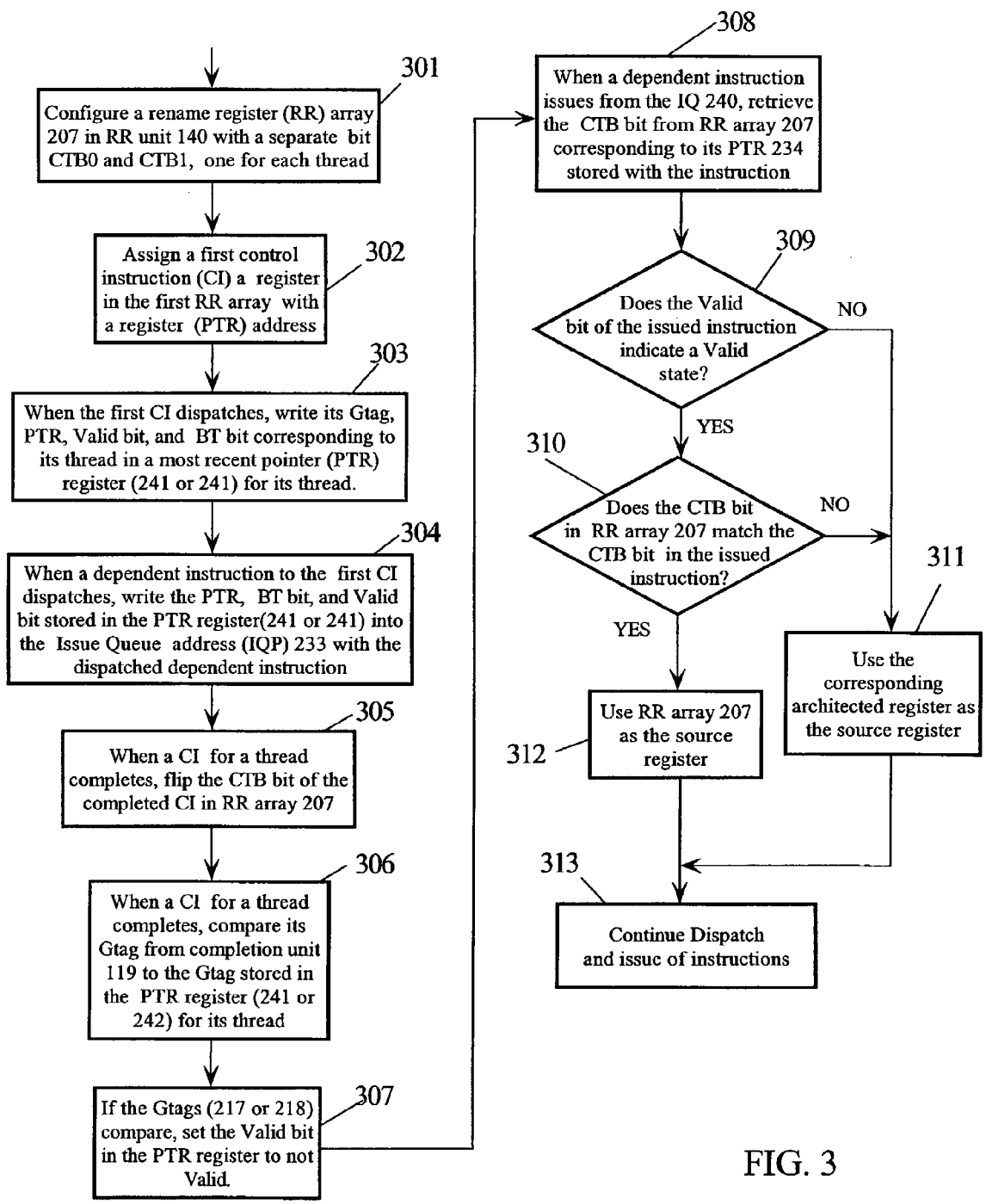
FIG. 3 is a flow diagram of method steps according to embodiments of the present invention.

FIG. 3 is a flow diagram of method steps used in embodiments of the present invention. In step 301, a shared RR array 207 for an SMT processor 410 is configured with a CTB0 for T0 and a CTB1 for T1 at each register entry position in the RR array 207. In step 302, a first CI is assigned a register entry in the RR array 207 with a corresponding register (PTR) address. In step 303, when the first CI is dispatched from IDU 132, a tag (Gtag) identifying the first CI, its PTR address, its CTB bit, and its Valid bit are retrieved from RR array 207 by IDU 132 and written into a PTR register (241 or 242) corresponding to the thread of the first CI . In step 304, a dependent instruction to the first CI is dispatched to IQ 240 (in IIQs 131) to a selected IQP address. The PTR address, CTB bit, and Valid bit stored in the PTR register corresponding to the dispatched CI are written into the IQ 240 with the dispatched dependent instruction at the selected IQP 233. In step 305, any time a CI completes, its corresponding CTB bit in the RR array 207 is flipped from it current logic state to an opposite logic state. In step 306, any time a CI for a thread completes, the Gtag 213 of the completed CI is compared to the Gtag stored in the PTR register corresponding to its thread. If the Gtags match, then the Valid bit stored in the PTR register is set to a not Valid state in step 307.

In step 308, the CTB bit corresponding to an issuing dependent instruction from the IQ is retrieved from the RR array 207 at a PTR corresponding to the PTR 234 stored in the issuing dependent instruction. In step 309, a test is done to determine if the Valid bit of the issuing dependent instruction is in a Valid state. If the results of the test in step 309 is NO, then in step 311 the issuing instruction uses the corresponding architected register as its source register for its control bits for a dispatched CI. If the results of the test in step 309 is YES, then in step 310 a test is done to determine if the CTB bit retrieved from the RR array 207 matches the CTB bit stored with the issuing instruction from the IQ 240. If the result of the test in step 310 is NO, the again in step 311 the issuing instruction uses the corresponding architected register as its source register for its control bits for a dispatched CI. If the result of the test in step 310 is YES, then the issuing instruction uses the corresponding register in the RR array 207 as its source register for its control bits. In step 313, instruction dispatch and issue are continued.

Figure 4:
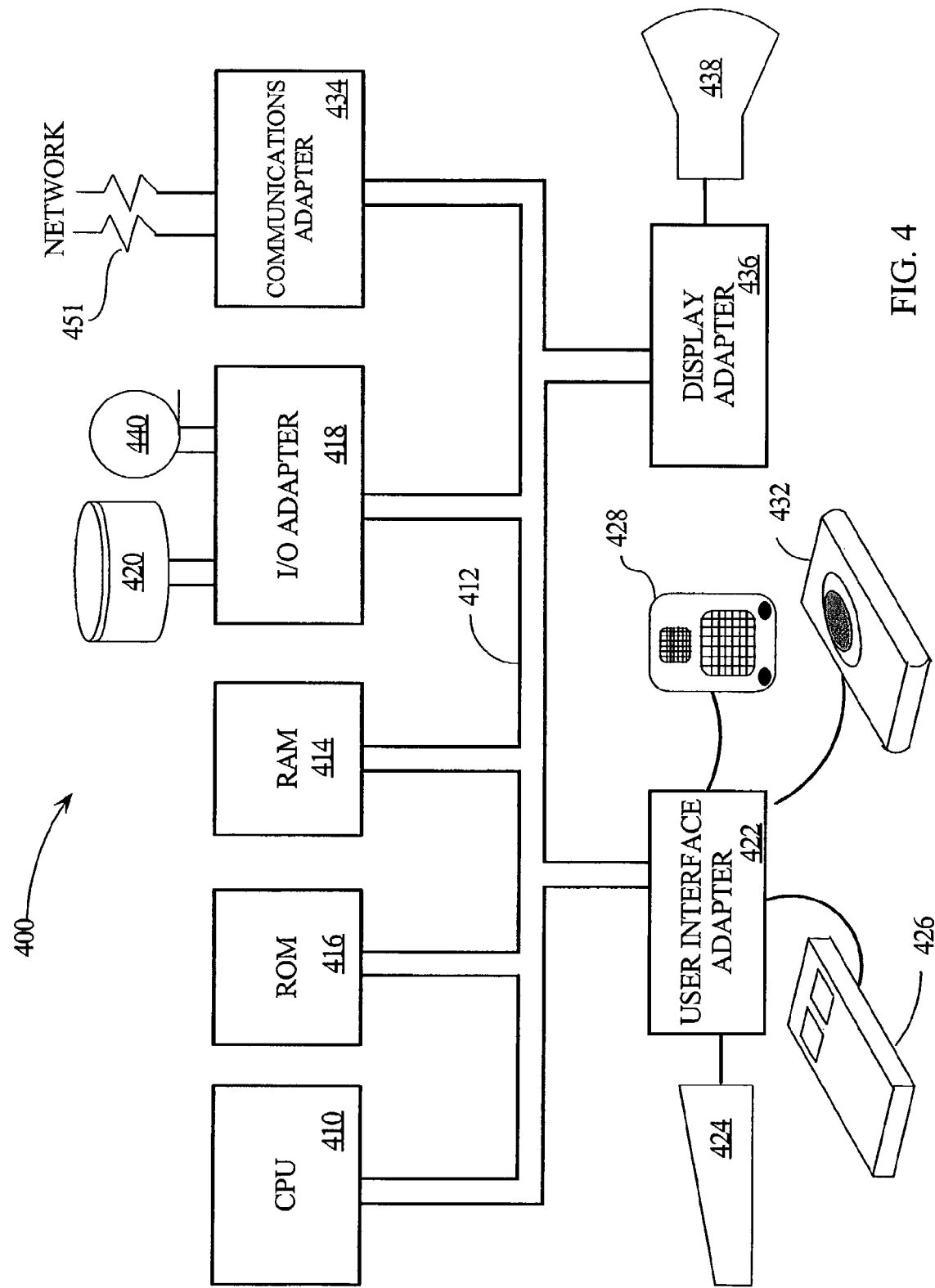
FIG. 4 is a representative hardware environment for practicing the present invention.

A representative hardware environment for practicing the present invention is depicted in FIG. 4, which illustrates a typical hardware configuration of a workstation in accordance with the subject invention having central processing unit (CPU) 410 with simultaneous multithread (SMT) processing and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method for using a single shared rename register (RR) array in a simultaneous multithread (SMT) processor comprising the steps of:
    configuring said RR array with a separate complete thread bit (CTB) for a thread zero and for a thread one at each register of said RR array corresponding to a pointer address (PTR);
    assigning a first instruction a first register in said RR array corresponding to a first PTR and setting a corresponding first valid bit at said first PTR to indicate a valid state, said first register also having a first CTB with a current logic state corresponding to a thread of said first instruction; and
    flipping said current logic state of said first CTB in said RR array to its opposite logic state when said first instruction completes and setting said first valid bit to a not valid state.

2. The method of claim 1 further comprising the steps of:
    assigning said first register at said first PTR as a source register for a dependent instruction; and
    storing said first PTR, first CTB, first valid bit, and a first instruction tag (Gtag), identifying said first instruction, in a current register for its thread when said first instruction dispatches.

3. The method of claim 2 further comprising the step of:
    storing said first PTR, said first CTB and said first valid bit in an instruction queue (IQ) at an IQ address along with said dependent instruction when said dependent instruction dispatches.

4. The method of claim 3 further comprising the step of:
    retrieving said first CTB from said RR array at said first PTR when said dependent instruction issues from said IQ.

5. The method of claim 4 further comprising the step of:
    using an architected register as a source register for said dependent instruction if said first valid bit stored at said IQ of said dependent instruction is in a not valid state.

6. The method of claim 4 further comprising the steps of:
    comparing a first logic state of said first CTB retrieved from said RR array to a second logic state of said first CTB stored with said dependent instruction in said IQ if said first valid bit stored at said IQ is in a valid state;
    using an architected register as a source register for said dependent instruction if said first and second logic states do not compare; and
    using said first register at said first PTR as said source register for said dependent instruction if said first and second logic states do compare.

7. The method of claim 2 further comprising the steps of:
    comparing a second Gtag of a completing instruction to said first Gtag stored in said current register; and
    setting said valid bit in said current register to a not valid state if said first and second Gtags match.

8. A simultaneous multithread (SMT) processor comprising:
    a shared rename register (RR) array having a separate complete thread bit (CTB) for a thread zero and for a thread one at each entry of said RR array corresponding to a pointer address (PTR);
    circuitry for assigning a first instruction a first register in said RR array corresponding to a first PTR and setting a corresponding first valid bit at said first PTR to indicate a valid state, said first register also having a first CTB with a current logic state corresponding to a thread of said first instruction; and
    circuitry for flipping said current logic state of said first CTB in said RR array to its opposite logic state when said first instruction completes and setting said first valid bit to a not valid state.

9. The processor of claim 8 further comprising:
    circuitry for assigning said first register at said first PTR as a source register for a dependent instruction; and
    circuitry for storing said first PTR, first CTB, first valid bit, and a first instruction tag (Gtag), identifying said first instruction, in a current register for its thread when said first instruction dispatches.

10. The processor of claim 9 further comprising:
circuitry for storing said first PTR, said first CTB and said first valid bit in an instruction queue (IQ) at an IQ address along with said dependent instruction when said dependent instruction dispatches.

11. The processor of claim 10 further comprising:
circuitry for retrieving said first CTB from said RR array at said first PTR when said dependent instruction issues from said IQ.

12. The processor of claim 11 further comprising:
circuitry for assigning a corresponding architected register as a source register for said dependent instruction if said first valid bit stored at said IQ of said dependent instruction is in a not valid state.

13. The processor of claim 12 further comprising:
circuitry for comparing a first logic state of said first CTB retrieved from said RR array to a second logic state of said first CTB stored with said dependent instruction in said IQ if said first valid bit stored at said IQ is in a valid state;
circuitry for assigning a corresponding architected register as a source register for said dependent instruction if said first and second logic states do not compare; and
circuitry for assigning said first register at said first PTR as said source register for said dependent instruction if said first and second logic states do compare.

14. The processor of claim 9 further comprising:
circuitry for comparing second Gtag of a completing instruction to said first Gtag stored in said current register; and
circuitry for setting said valid bit in said current register to a not valid state if said first and second Gtags match.

15. The processor of claim 8, wherein said RR array is for a floating point status and control register (FPSCR).

16. A data processing system comprising:
a central processing unit (CPU) having one or more simultaneous multithread (SMT) processors;
a random access memory (RAM);
an input output (I/O) adapter;
a communications adapter;
a bus coupling said CPU, RAM, I/O adapter, and said communications adapter;
a shared rename register (RR) array having a separate complete thread bit (CTB) for a thread zero and for a thread one at each entry of said RR array corresponding to a pointer address (PTR);
circuitry for assigning a first instruction a first register in said RR array corresponding to a first PTR and setting a corresponding first valid bit at said first PTR to indicate a valid state, said first register also having a first CTB with a current logic state corresponding to a thread of said first instruction; and
circuitry for flipping said current logic state of said first CTB in said RR array to its opposite logic state when said first instruction completes and setting said first valid bit to a not valid state.

17. The data processing system of claim 16 further comprising:
circuitry for assigning said first register at said first PTR as a source register for a dependent instruction; and
circuitry for storing said first PTR, first CTB, first valid bit, and a first instruction tag (Gtag), identifying said first instruction, in a current register for its thread when said first instruction dispatches.

18. The data processing system of claim 17 further comprising:
circuitry for storing said first PTR, said first CTB and said first valid bit in an instruction queue (IQ) at an IQ address along with said dependent instruction when said dependent instruction dispatches.

19. The data processing system of claim 18 further comprising:
circuitry for retrieving said first CTB from said RR array at said first PTR when said dependent instruction issues from said IQ.

20. The data processing system of claim 19 further comprising:
circuitry for assigning a corresponding architected register as a source register for said dependent instruction if said first valid bit stored at said IQ of said dependent instruction is in a not valid state.

21. The data processing system of claim 20 further comprising:
circuitry for comparing a first logic state of said first CTB retrieved from said RR array to a second logic state of said first CTB stored with said dependent instruction in said IQ if said first valid bit stored at said IQ is in a valid state;
circuitry for assigning a corresponding architected register as a source register for said dependent instruction if said first and second logic states do not compare; and
circuitry for said first register at said first PTR as said source register for said dependent instruction if said first and second logic states do compare.

22. The data processing system of claim 21 further comprising:
circuitry for comparing said second Gtag of a completing instruction to said first Gtag stored in said current register; and
circuitry for setting said valid bit in said current register to a not valid state if said first and second Gtags match.

23. The data processing system of claim 16, wherein said RR array is for a floating point status and control register (FPSCR).

* * * * *